United States Patent [19]
Kayser

[11] 3,768,770
[45] Oct. 30, 1973

[54] VALVE

[76] Inventor: Lutz Tilo Kayser, D-7 Stuttgart, 1 Am Bismarckturn 10, Germany

[22] Filed: Aug. 29, 1972

[21] Appl. No.: 284,837

[30] Foreign Application Priority Data
Sept. 1, 1971  Germany.................. P 21 43 655.3

[52] U.S. Cl.............................. 251/25, 251/61.2
[51] Int. Cl............................................ F16k 31/14
[58] Field of Search................... 251/25, 158, 282, 251/61.2; 137/246.12, 246

[56] References Cited
UNITED STATES PATENTS
1,826,941  10/1931  La Mont........................ 251/56 X

*Primary Examiner*—Arnold Rosenthal
*Attorney*—Michael S. Striker

[57] ABSTRACT

A valve has a housing provided with an inlet for pressurized fluid, a valve seat having a seating surface, and a valve member exposed to the incoming pressurized fluid and having a cooperating surface juxtaposed and normally in engagement with the seating surface. At least one of these surfaces is provided with a shallow recess in which a conduit terminates which communicates with the inlet so as to admit into the recess sufficient pressurized fluid to lift the valve member off the valve seat. A control valve is interposed in the conduit and can be operated to permit the flow of pressurized fluid therethrough and into the recess.

8 Claims, 2 Drawing Figures

Fig.1a
Fig.1b
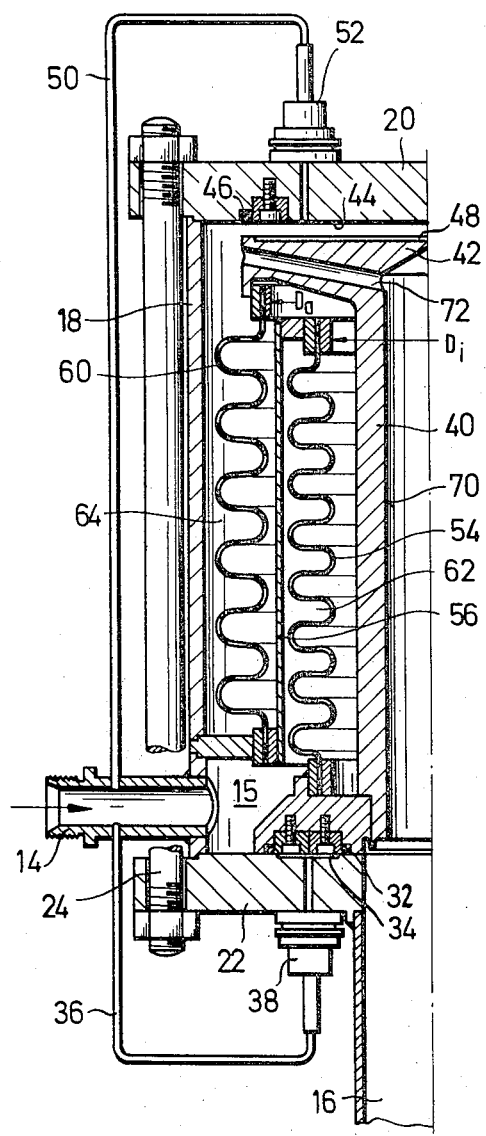
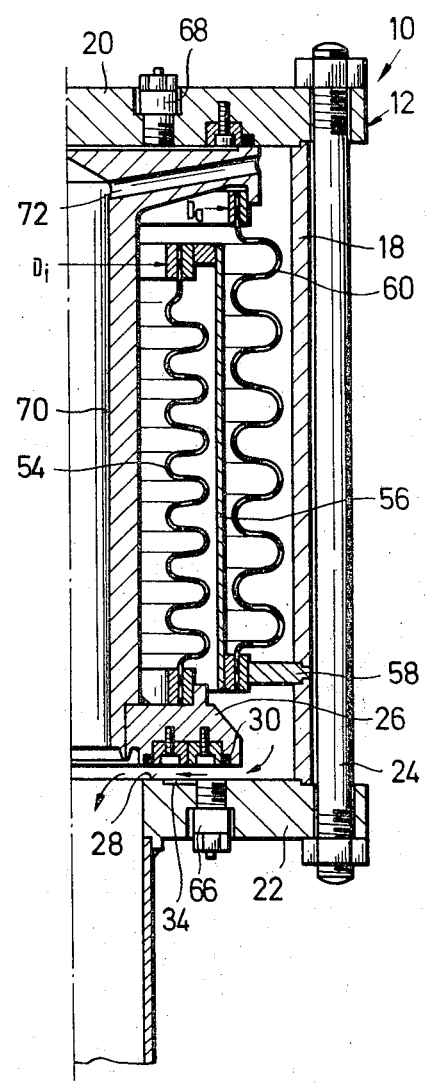

VALVE

The present invention relates to a valve, and more particularly to a valve which controls the flow of pressurized fluid. Still more particularly the invention relates to a valve in which a main valve member controlling the flow of pressurized fluid is moved to open position when a branch flow of the incoming pressurized fluid is admitted by an auxiliary valve member to the main valve member so as to lift the latter off its valve seat.

Constructions of the general type here concerned are already known from the prior art. For instance, one prior-art valve construction has a valve member which is pressed against its valve seat by the pressurized fluid whose flow it controls, and which can be lifted off its valve seat by diverting via an auxiliary valve some of the pressurized fluid against the main valve member. The main valve member itself has a hollow piston portion which, when the valve is closed, is filled with pressurized fluid and which fluid is permitted to escape from the piston portion upon opening of the auxiliary valve. In this prior art construction it has been observed that the main valve member with the hollow valve piston can be raised off its valve seat only rather slowly, because the outlet bore in the hollow valve piston is quite small and the pressurized fluid in the valve piston can be displaced through the outlet bore —when the auxiliary valve controlling the latter is opened — only slowly. Evidently, the response time of a valve is important in a great many applications and the slow lifting-off of the main valve member in the prior-art construction is found to be a disadvantage in such instances.

A further prior-art proposal concerns a valve construction in which, when the valve is operated, a portion of the valve piston surface is initially subjected to fluid pressure, and therafter the total surface of the valve piston is subjected to this fluid pressure. This also, has not been found to be entirely satisfactory for various reasons, a comment which applies to still another prior-art proposal in which an electromagnetic arrangement is utilized.

Accordingly, there exists in the art a need to overcome the existing disadvantages of the prior proposals, and it is therefore a general object of the present invention to provide an improved valve which avoids these disadvantages.

More particularly, it is an object of the present invention to provide an improved valve of the type here generally under discussion, but which has a much more rapid response time than the prior-art valves.

Another object of the invention is to provide such an improved valve which, despite its improved characteristics, is relatively simple in its construction and highly reliable in its operation.

In pursuance of the above objects, and of others which will become apparent hereafter, one feature of the invention resides in a valve, in a combination which briefly stated comprises a housing having an inlet for pressurized fluid. A valve seat is provided in this housing and has a seating surface and a valve member is exposed to the incoming pressurized fluid and has a cooperating surface juxtaposed and normally in engagement with the seating surface, with at least one of these surfaces being provided with a shallow recess. A conduit communicates with the inlet and with the recess for the purpose of admitting into the latter sufficient pressurized fluid to lift the valve member off the valve seat. A control valve is interposed in this conduit and is operable for permitting the flow of pressurized fluid therethrough.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

FIG. 1a is an axial section through an exemplary embodiment of the invention; and FIG. 1b is a view similar to FIG. 1, showing a portion of the valve which is mirror symmetrical with reference to that shown in FIG. 1a but with the valve in a different operating position from that of FIG. 1.

Before discussing the two Figures in detail it is pointed out that FIGS. 1a and 1b together constitute an axial section through a complete valve embodying the invention. However, in each Figure the valve is illustrated in a different operational position for the sake of explanation.

With this in mind, and referring both to FIGS. 1a and 1b, it will be seen that the novel valve is designated in toto with reference numeral 10. The valve has a housing 12 comprising a tubular circumferential wall 18 and two end walls 20 and 22 located at the opposite open ends of the end wall 18 and connected with one another by threaded bolts 24.

The housing 12 has an inlet 14 for pressurized fluid and an outlet 16 for the fluid.

A valve seat 28 is provided on the inner side of the end wall 22, that is the side facing the interior of the housing and cooperates with a valve member 26. The cooperating surface of the valve member 26, that is the surface which is juxtaposed with the seating surface of the valve seat 28, is provided with two concentric sealing rings 30 and 32, which are maintained in place in suitable manner, for instance by retaining rings and screws passing through the retaining rings into the valve member 26. The sealing rings 30 and 32 themselves may be metallic rings, O-rings of elastomeric material or the like. In fact, it is possible to provide the cooperating surface of the valve member 26, in addition or in lieu of the sealing rings 30 and 32, with appropriate sealing edges or sealing surface portions which can sealingly cooperate with the seating surface of the valve seat 28.

In any case, the seating surface of the valve seat 28 and/or the cooperating surface of the valve member 26 is provided as illustrated with a shallow recess 34 which in the illustrated embodiment is annular. Of course, if both of these surfaces are provided with such a recess 34, then the two recesses would have to communicate with one another when the surfaces are in sealing engagement. It is emphasized that the depth of the recess 34 has been exaggerated in the drawing for purposes of clarity; in actual fact the depth of the annular recess 34, as seen in axial direction of the latter, may for instance be on the order of some hundredth of a millimeter or some tenth of a millimeter. The inner diameter of the recess 34 is somewhat greater than the diameter of the sealing ring 32, and the outer diameter of the recess 34 is somewhat smaller than the diameter of the sealing ring 30, as shown.

A conduit 36 communicates with the inlet 14 as well as with the valve seat 28, where it opens into the recess 34 intermediate the sealing rings 30 and 32. It will be appreciated that a single or two or more of these conduits 36 can be provided, as a particular application may require. Interposed in the conduit 36 is an auxiliary valve 38 which may be solenoid-operated or which may be a multi-way valve, as will be discussed later.

A tubular portion 40 is provided which is fast with the valve member 26, for instance by being welded to it as indicated by the illustrated welded seam, and which extends axially from the valve member 26 in the direction in which the same will move when it lifts off the valve seat 28. In the region of the opposite end of the tubular member 40 there is provided another valve member, designated with reference numeral 42 and serving as a closure valve. This closure valve 42 cooperates with a valve seat 44 provided on the inner side of the end wall 20. A sealing ring 46 is provided on the valve seat 44 and is maintained in place in suitable manner, for instance again by means of a retaining ring and screws. The valve member 42 may be secured to the tubular member 40 in the manner in which the latter has the valve member 26 secured to it, or it may be of one piece with the tubular member 40, as is illustrated in the drawing.

The juxtaposed surfaces of the valve seat 44 and of the valve member 42 are again provided with a shallow annular recess 48; as in the case of the recess 34, the recess 48 may be provided in the seating surface of the valve seat 44, in the cooperating surface of the valve member 42, or in both of them. The diameter of the recess 48 is so selected that it is within the outer diameter of the sealing ring 46. A conduit 50 communicates with the inlet 14 and with the valve seat 44, opening into the recess 48. Interposed in the conduit 50 is a control valve or auxiliary valve 50 which may be of the same type as the valve 38.

As the drawing shows, the valve member 26 is connected pressure tightly, but with freedom of elastic axial movement, with the wall 18 of the housing, via an inner tubular spring bellows member 54, a rigid sleeve 56 and a ring member 58. The valve member 42 is similarly connected with the wall 18 in pressure-tight but axially elastically yieldable manner, via a concentric outer spring bellows member 60 and the aforementioned ring member 58. It will be seen that with this construction an annular chamber or clearance 64 exists between the housing 12 on the one hand and the ring member, the bellows member 60 and the valve member 42 on the other hand. The chamber 64 is in communication with the outlet 16 by means of substantially radial channels 72 in the valve member 42 and an axial channel 70 in the tubular member 40. An additional chamber 62 is defined by the inner bellows member 54 and the sleeve 56, communication with the inlet 14. The operation of my novel valve will be readily understood from what has been set forth above. Pressurized fluid is admitted via the inlet 14 into an inlet chamber 15, exerting upon the valve member 26 sufficient pressure to press it against the valve seat 28 so that the valve prevents any passage of pressurized fluid from the inlet 14 to the outlet 16, because the sealing ring 30 seals the inlet chamber 15 with respect to the outlet 16.

If, now, the valve is to be opened and the passage of fluid from the inlet 14 to the outlet 16 is to be permitted, then the valve member 26 must be lifted off its valve seat 28. For this purpose the control valve 38 is operated so as to open communication between the inlet 14 and the recess 34 via the conduit 36. As mentioned before, the control valve 38 may for instance be of the electromagnetically operated type, that is it may be solenoid-operated.

As soon as the valve 38 is operated to permit flow of pressurized fluid from the inlet 14 through the conduit 36 into the recess 34, pressure develops in the recess 34 as a result of the incoming pressurized fluid. Because of the very small volume of the recess 34, the pressure therein rises very rapidly to a sufficient level, for instance within approximately 1 millisecond. This pressure now lifts the valve member 26 off the valve seat 28, that is it moves the valve member 26 upwardly in FIG. 1a so that it reaches the position illustrated in FIG. 1b. A very small stroke, that is a very small movement of the valve member 26 out of engagement with the valve seat 28, is sufficient to permit the main flow of pressurized fluid from the chamber 15 into the recess 34 and in contact with the cooperating working surface of the valve member 26, which latter is thereupon moved by the pressure of the main portion of the pressurized fluid to its fully open position in a very rapid time, for instance within approximately 2 milliseconds. To afford such access of the fluid from the inlet chamber 15 to the working surface of the valve member 26, it is merely necessary that the working surface move away from engagement with the valve seat 28 by a distance which may be as low as approximately 0.1 mm and which need not be more than several tenths of a millimeter.

Of course, it will be appreciated that for proper operation of the valve in accordance with the concept of the invention, it is necessary that the surface area of the valve member 26 upon which the fluid admitted into the recess 34 via the conduit 36 acts, is sufficiently greater than the surface area of the valve member 26 upon which the pressurized fluid in the inlet chamber 15 acts, so as to be able to counterbalance the action of the pressurized fluid in the inlet chamber 15 and to overcome it. It should be understood that no attempt has been made in FIGS. 1a and 1b to show these relationships, inasmuch as this is well within the skill of the art.

While the valve member 26 is in closed position, and during the entire time required for the valve member 26 to move to fully open position, the auxiliary or control valve 52 is in closed position. Similarly, when the valve member 26 has reached its fully open position, the valve 38 is also closed again. It will be appreciated that when the valve member 26 is in fully open position, the valve member 42 is in sealing engagement with its valve seat 44 against which it is urged by the admitted pressurized fluid, as shown in FIG. 1b.

In the position shown in FIG. 1b, that is when the valve is open, the chamber 64 communicates with the outlet 16 via the channels 70 and 72, so that the same pressure level obtains in the chamber 64 as in the outlet 16.

If the valve is subsequently to be closed again, that is to be returned from the position of FIG. 1b to the position of FIG. 1a, then the control valve 52 is opened. This valve may also be electromagnetically operated. When it is opened, it permits the flow of pressurized fluid from the inlet 14 via the conduit 50 into the recess 48. The same results are now obtained with respect to the valve member 42 which were previously obtained with respect to the valve member 26. In other words, pressure in the small-volume recess 48 builds up very rapidly until it is sufficient (again keeping in mind the necessary differential between the surface areas of the valve member 42 which are impinged by the fluid in the recess 48 and by the fluid which acts upon the outer side of the valve member 42) to lift the valve member 42 off the valve seat 44. This movement of course takes place in downward direction in FIGS. 1a and 1b thereby shifting the tubular member 40 in the same direction and moving the valve member 26 into sealing engagement with the valve seat 28. This movement permits the pressurized fluid from the chamber 64 to enter into the recess 48 and now press against the working surface of the valve member 42, and it is this main pressure which actually effects the major movement of the valve member 42 and the valve member 26, the pressure in recess 48 having been only sufficient to lift the valve member 42 far enough off the valve seat 44 to permit the entry of fluid from the chamber 64. This initial movement again can be very small, requiring only a few tenths of a millimeter and it can be as small as approximately 0.1 mm so that the time required for a complete opening movement of the valve member 42, and thus a complete closing movement of the valve member 26, is on the order to approximately 2 milliseconds.

During the closure movement, that is the movement of the valve member 26 towards engagement with its valve seat 28, a closing pressure develops between the valve members 26 and 42 which is proportional to the surface area difference of the concentric tubular bellows members 54 and 60, because a force acts upon the valve member 26 in the direction of valve opening which equals the pressure of the pressurized fluid multiplied by the surface area of the inner bellows member 54, whereas the valve member 42 is under a force in the closing direction of the valve which equals the pressure of the pressurized fluid multiplied by the surface area of the outer bellows member 60. The term surface area here is indicated to designate the cross-sectional area of the bellows members 54 and 60, as designated by their diameters $D_i$ and $D_a$ shown in the drawing. Once the closure movement is completed, the control valve 52 is closed again.

It is emphasized that a multi-way valve, for instance a three-way valve, can replace each of the valves 38 and 52, and that such a multi-way valve can in fact be used as a single valve controlling both of the conduits 36 and 50, rather than requiring two separate control vales 38 and 52.

The drawing further illustrates the use of vent valves 66 and 68. These can be but must not be provided. If they are provided, as shown, then they communicate with the recesses 34 and 48, respectively, their purpose being to vent the interior of these recesses to the exterior of the valve in the event that the sealing rings 40 or 46 should develop a leak because in this case the valve would switch unintentionally, that is without being required to do so by operation of the valves 38 or 52, in the absence of such vent valves 66 and 68. If each of the valves 38 and 52 is replaced by a three-way valve, as suggested above as a possibility, then the vent valves 66 and 68 can be omitted because the venting can then effected via the respective three-way valves.

It will be understood that each of the elements described agove, or two or more together, may also find a useful application in other types of constructions differing from the types described above.

While the invention has been illustrated and described as embodied in a valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a valve, a combination comprising a housing having an inlet for pressurized fluid; a valve seat in said housing and having a seating surface; a valve member exposed to the incoming pressurized fluid and having a cooperating surface juxtaposed and normally in engagement with said seating surface, at least one of said surfaces being provided with a shallow recess; a conduit communicating with said inlet and said recess for admitting into the latter sufficient pressurized fluid to lift said valve member off said valve seat; and a control valve interposed in said conduit and operable for permitting the flow of pressurized fluid therethrough.

2. A combination as defined in claim 1; further comprising an additional valve seat in said housing spaced from the first-mentioned valve seat in direction of movement of said valve member and having an additional seating surface; an additional valve member connected for movement with the first-mentioned valve member and having an additional cooperating surface, at least one of said additional surfaces having an additional shallow recess; an additional conduit communicating with said inlet and with said additional recess for admitting into the latter sufficient pressurized fluid to lift said additional valve member off said additional valve seat; and an additional control valve interposed in said additional conduit and operable for permitting the flow of pressurized fluid therethrough.

3. A combination as defined in claim 2; further comprising a first spring bellows member connecting said first-mentioned valve member with said housing, and a second spring bellows member connecting said additional valve member with said housing.

4. A combination as defined in claim 3, said bellows members being tubular and concentric with one another.

5. A combination as defined in claim 3, said bellows members being tubular and said first member concentrically surrounding said second bellows member and having an inner diameter greater than that of said second bellows member.

6. A combination as defined in claim 2; and further comprising a pair of venting valves each provided at one of said valve seats and communicating with the respective seating surface thereof.

7. A combination as defined in claim 2, wherein each of said control valves is a multi-way valve.

8. A combination as defined in claim 1; further comprising an additional valve seat in said housing spaced from the first-mentioned valve seat in direction of movement of said valve member and having an additional seating surface; an additional valve member connected for movement with the first-mentioned valve member and having an additional cooperating surface, at least one of said additional surfaces having an additional shallow recess; and an additional conduit communicating with said inlet and with said additional recess for admitting into the latter sufficient pressurized fluid to lift said additional valve member off said additional valve seat; and wherein said control valve is a multi-way valve interposed in both of said conduits and operable for selectively permitting the flow of pressurized fluid through a respective one of said conduits.

* * * * *